(12) United States Patent
Strackbein et al.

(10) Patent No.: US 7,042,235 B2
(45) Date of Patent: May 9, 2006

(54) METHOD FOR THE DETECTION OF LEAKS IN COMPONENTS CONDUCTING LIQUIDS AND DEVICE FOR EXECUTING THE METHOD

(75) Inventors: Heinrich Strackbein, Biebertal (DE); Markus Hain, Dillenburg (DE); Jörg Kreiling, Biebertal (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/896,635

(22) Filed: Jul. 22, 2004

(65) Prior Publication Data
US 2005/0062487 A1    Mar. 24, 2005

(30) Foreign Application Priority Data
Aug. 9, 2003   (DE) ................................ 103 36 679

(51) Int. Cl.
*G01R 27/26*    (2006.01)

(52) U.S. Cl. ........................................ 324/686; 324/696

(58) Field of Classification Search ................ 324/686, 324/696
See application file for complete search history.

(56) References Cited

U.S. PATENT DOCUMENTS

| 4,135,384 | A  | * | 1/1979 | Burwell et al. ............... 73/40.7 |
| 6,175,310 | B1 | * | 1/2001 | Gott ........................... 340/605 |
| 6,608,490 | B1 | * | 8/2003 | Tombini ..................... 324/692 |

* cited by examiner

Primary Examiner—Vincent Q. Nguyen
(74) Attorney, Agent, or Firm—Pauley Petersen & Erickson

(57) ABSTRACT

A method and a device for detecting leaks in components conducting liquids by a sensor reacting to leaks. The component to be monitored is inserted into a closable envelope containing the leaked liquid. Electrodes are embedded into the envelope. The resistance and/or the capacitance between the electrodes is changed if leaking liquid enters the closed envelope. With a sensor connected to the electrodes, which reacts to the resistance and/or capacitance changes, a display and/or alarm signal is triggered. It is possible to monitor the entire component for leaks.

22 Claims, 1 Drawing Sheet

METHOD FOR THE DETECTION OF LEAKS IN COMPONENTS CONDUCTING LIQUIDS AND DEVICE FOR EXECUTING THE METHOD

BACKGROUND OF THE INVENTION

1. Field of the Invention

This invention relates to a method for detecting leaks in components conducting liquids by means of a sensor reacting to leaks. The invention further relates to a device for executing the method.

2. Discussion of Related Art

It is known that systems through which liquids are conducted can become leaky, so that liquid leaks from the components of the system. This danger is increased if the liquid in the system is under pressure.

In connection with the construction of switchgear cabinets, systems which conduct liquids are primarily employed for cooling electrical and electronic components and groups of components. Water and mixtures of water and antifreeze are used as the liquid, also called cooling water or cold water.

Especially leaks which occur in such cooling systems are particularly disadvantageous, because the cooling effect is reduced by the loss of cooling water, which can lead to losing the electrical or electronic components and groups of components. Also, the cooling water from the leaks can lead to other damage and endangerment of the cooling system and the components and groups of components.

SUMMARY OF THE INVENTION

It is one object of this invention to provide a method and a device by which leaks in components of systems which conduct liquids can be detected rapidly and without a large technical cost, and steps can be taken for preventing extensive damage caused by the leaks.

In accordance with this invention, this object is achieved with a method wherein the component to be monitored is inserted into a closable envelope containing the leaked liquid, the electrodes are embedded into the envelope, the resistance and/or the capacitance between the electrodes is changed if leaking liquid enters the closed envelope, and a display or alarm signal is triggered by a sensor connected to the electrodes, which reacts to the resistance and/or capacitance changes.

The component of the system is completely enclosed by the envelope and the leaking liquid can penetrate the envelope and change the resistance and/or the capacitance between the electrodes so that the connected sensor reacts and triggers a display or alarm signal. It is then possible to trace the reason for the fault and extensive losses and damages can be avoided.

In accordance with one embodiment of this invention, the envelope of the component is made from a material which absorbs leaking liquid, which is closed in a liquid-proof manner at least toward the exterior. Thus the leaking liquid enters the area of the embedded electrodes in a simple manner, but cannot escape from the envelope and cause damage there.

Embedding the electrodes occurs in an advantageous manner because the electrodes are embedded in the envelope, preferably in the flow direction of the liquid in the enveloped component.

The device for executing the method is primarily distinguished because an envelope containing a liquid can be applied by an opening onto the component to be monitored, wherein the interior shape is matched to the exterior shape of the component and supports an electrical insulation layer, but is itself permeable to liquid, and following the application of the envelope to the component the opening and the exterior shape of the envelope can be closed in a liquid-proof manner. Thus, the envelope can be easily applied to the component and closed, so that the component is completely enclosed and leakage occurring at any place of the component can be easily detected. During this it is easily possible to take the shape of the component into account by matching component and envelope. In one embodiment, a component is embodied as a hose or tube, the envelope is designed with a slit in the longitudinal direction as the opening, and after applying the envelope to the component the slit is glued together or pasted over in a liquid-proof manner.

The insertion of the electrodes can be provided with the envelope so that at least two electrodes are embedded in the open-pored foamed material in the longitudinal direction of the envelope, wherein the electrodes are conducted in a spiral shape and with constant spacing in the longitudinal direction of the envelope, or can be embodied as a wire frame. There are many options for the design of the envelope and the embedding of the electrodes that can be used without departing from the basic principle of this invention. With simplifying the manufacture it is possible for the envelope to be designed in multiple layers and for the electrodes to be arranged between the layers of the envelope.

In one embodiment, the connection of the sensor is distinguished because one electrode is used as the ground connection of the sensor. The ground connection can be specially designed and identified. The structure of the envelope can also have several layers, such as foils, felts or non-wovens, which are permeable to liquids.

With complex systems with conductors, armatures and the like it is possible to realize the total monitoring because components which are arranged sequentially in a liquid system have separate envelopes with embedded electrodes, and separate sensors are assigned to the electrodes, or the electrodes are connected in parallel and are connected to a common sensor. Thus the different components with matched envelopes having electrodes can be monitored and combined into a total monitoring system, wherein a general fault signal or individual fault signals for the components can be derived.

BRIEF DESCRIPTION OF THE DRAWINGS

This invention is explained in greater detail in view of schematic exemplary embodiments, wherein.

DESCRIPTION OF PREFERRED EMBODIMENTS

Figure 1:
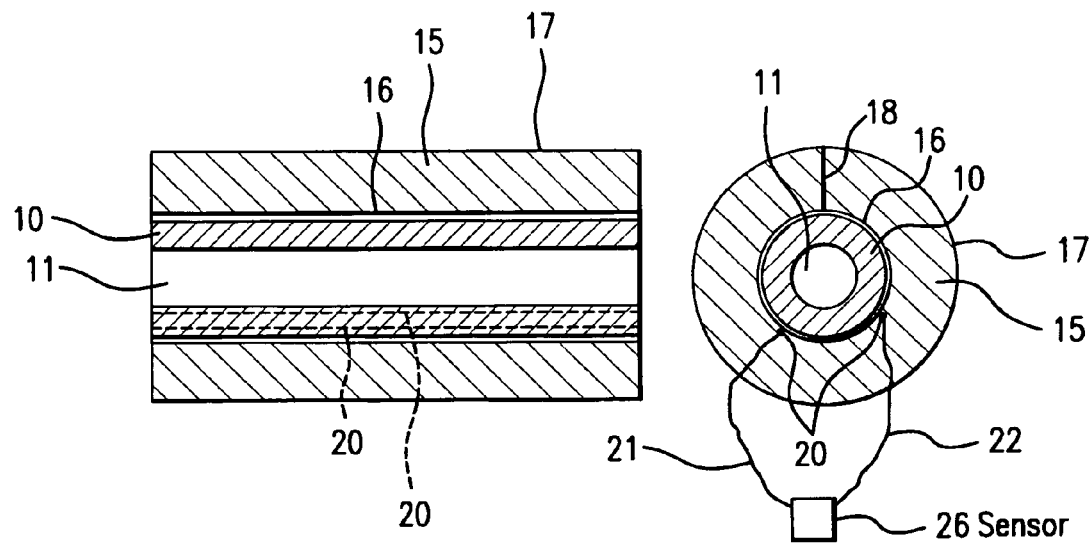
FIG. 1 shows a leakage monitoring device in longitudinal and cross section for a tube or a hose, having a sensor reacting to changes in resistance.

A portion of a hose assembly is shown in the left portion of FIG. 1 as a component 10, in whose interior hollow space 11 the liquid flows. The hose assembly is inserted into a hose-like envelope 15, which has a longitudinal slit as an opening 18 for the subsequently provided attachment. The envelope 15 comprises an open-pored foamed material, a multi-layered film or non-woven with properties for absorbing liquid, so that leaking liquid can penetrate it easily. The interior shape 16 of the envelope 15 is matched to the exterior shape of the hose assembly, i.e. the component 10. This applies regardless of the shape of the component 10. The interior shape 16 of the envelope 15 is advantageously formed by an electrical insulating layer which is permeable to liquid, while the outside 17 of the envelope 15 is liquid-proof in order to prevent the absorbed leaked liquid from emerging.

At least two electrodes 20 are embedded into the inner area of the envelope 15, which are spaced apart from each other and extend in the longitudinal direction of the component 10, but which can also be spirally conducted while maintaining the spacing, or can also be embodied as woven or mat elements.

The electrodes 20 are conducted out of the envelope by connectors 21 and 22 and are connected with the sensor 26. In this case the sensor 26 also provides a voltage for the resistance measurement between the electrodes 20. The distance between the electrodes 20 is selected so that in a dry envelope 15 it provides a very high resistance, and if leaking liquid has penetrated into the envelope 15 it provides such a low resistance that the sensor outputs a signal very early and already in case of a small leak. The opening 18 of the envelope 15 can be tightly glued together or pasted over after the latter has been applied to the component 10.

Figure 2:
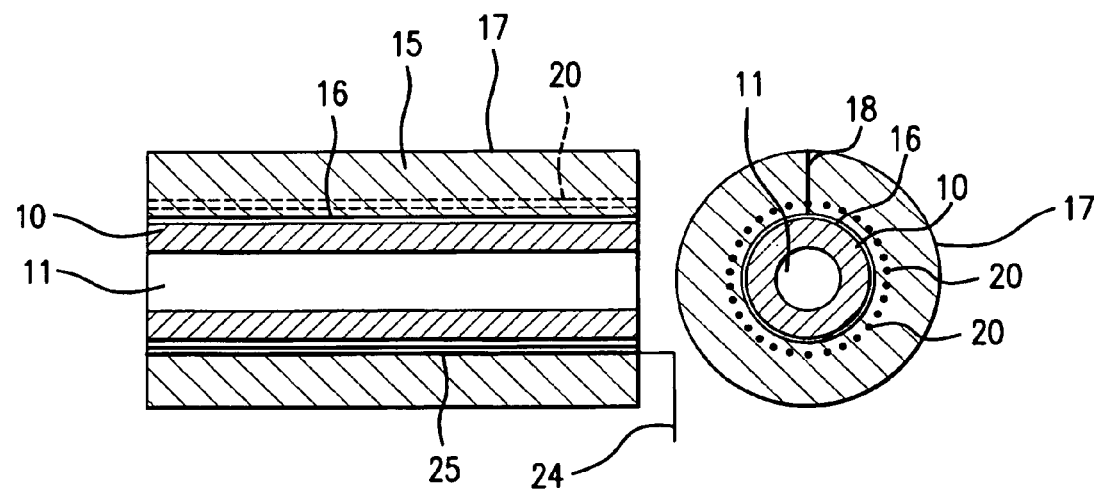
FIG. 2 shows a leakage monitoring device in longitudinal and cross section for a tube or a hose, having a sensor reacting to changes in capacitance.

In the embodiment of FIG. 2, the structure of the envelope 15 is substantially the same as shown in FIG. 1. The electrodes 20 simply form a circle around the component 10, and the interior shape 16 of the envelope 15 forms a ground connection 24. The leaking liquid entering between the ground connection 24 and the electrodes 20 reaches the electrodes 20 and changes the capacitance to the ground connection 24, so that the occurrence of leaks can be monitored in accordance with the sensor reacting to capacitance changes, and a display and/or alarm signal can be derived. Appropriate protective measures, such as turning off or reducing the pressure in the system or the like can be initiated by this signal.

The same measures in accordance with FIG. 1 or 2 can be applied in connection with any shape of the component 10 and a correspondingly designed envelope 15, wherein the latter can also be assembled from several fitted elements.

The components 10 which are a part of a total system can be monitored individually or as a whole. In case of common monitoring, the electrodes 20, 25 are switched in parallel and connected with a common sensor. The cost is greater with individual monitoring of the components 10, because every component 10 requires its own sensor. But searching for the fault is made easier, because the signals are fixedly assigned to the components 10.

German Patent Reference 103 36 679.2, the priority document corresponding to this invention, and its teachings are incorporated, by reference, into this specification.

What is claimed is:

1. A method for detecting leaks in components conducting liquids by a sensor reacting to leaks, the method comprising:
    inserting the component (10) to be monitored into a closable envelope (15) containing the leaking liquid, wherein the envelope (15) is applied by an opening (18) onto the component (10) to be monitored, wherein an interior shape (16) of the envelope (15) is matched to an exterior shape of the component (10) and supports an electrical insulation layer and is permeable to liquid, and following application of the envelope (15) to the component (10), the opening (18) and an exterior shape (17) of the envelope (15) is closed in a liquid-proof manner;
    embedding electrodes (20, 25) into the envelope;
    changing at least one of a resistance and a capacitance between the electrodes (20, 25) if leaking liquid enters the closed envelope (15); and
    with a sensor connected to the electrodes (20, 25), which reacts to at least one of a resistance change and a capacitance change, triggering at least one of a display signal and an alarm signal.

2. The method in accordance with claim 1, wherein the envelope (15) of the component (10) is made from a material which absorbs leaking liquid and which is closed in a liquid-proof manner at least on an exterior.

3. The method in accordance with claim 2, wherein the electrodes (20, 25) are embedded in the envelope (15), in a flow direction of the liquid in the enveloped component (10).

4. The method in accordance with claim 3, wherein the component (10) is embodied as one of a hose and a tube, the envelope (15) has a slit in a longitudinal direction as the opening (18), and after applying the envelope (15) to the component (10), the slit is one of glued together and pasted over in a liquid-proof manner.

5. The method in accordance with claim 4, wherein at least two electrodes (20, 25) are embedded in the open-pored foamed material in the longitudinal direction of the envelope (15).

6. The method in accordance with claim 5, wherein the electrodes (20, 25) have a spiral shape with a constant spacing in the longitudinal direction of the envelope (15).

7. The method in accordance with claim 6, wherein the electrodes (20, 25) each is embodied as a wire frame.

8. The method in accordance with claim 6, wherein the envelope (15) has multiple layers, and the electrodes (20, 25) are arranged between layers of the envelope (15).

9. The method in accordance with claim 8, wherein one of the electrodes (25) is used as a ground connection of the sensor.

10. The method in accordance with claim 8, wherein the layers of the envelope (15) are of one of foils, felts and non-wovens, which are permeable to liquids.

11. The method in accordance with claim 10, wherein components (10) which are arranged sequentially in a liquid system have separate envelopes (15) with embedded electrodes (20, 25), and one of separate sensors are assigned to the electrodes (20, 25) and the electrodes (20, 25) are connected in parallel and to a common sensor.

12. The method in accordance with claim 11, wherein the envelope (15) is of a plurality of fitted elements and shaped sections.

13. The method in accordance with claim 1, wherein the electrodes (20, 25) are embedded in the envelope (15), in a flow direction of the liquid in the enveloped component (10).

14. The method in accordance with claim 1, wherein the component (10) is embodied as one of a hose and a tube, the envelope (15) has a slit in a longitudinal direction as the opening (18), and after applying the envelope (15) to the component (10), the slit is one of glued together and pasted over in a liquid-proof manner.

15. The method in accordance with claim 14, wherein at least two electrodes (20, 25) are embedded in the open-pored foamed material in the longitudinal direction of the envelope (15).

16. The method in accordance with claim 15, wherein the electrodes (20, 25) have a spiral shape with a constant spacing in the longitudinal direction of the envelope (15).

17. The method in accordance with claim 1, wherein the electrodes (20, 25) each is embodied as a wire frame.

18. The method in accordance with claim 1, wherein the envelope (15) has multiple layers, and the electrodes (20, 25) are arranged between layers of the envelope (15).

19. The method in accordance with claim 1, wherein one of the electrodes (25) is used as a ground connection of the sensor.

20. The method in accordance with claim 19, wherein the layers of the envelope (15) are of one of foils, felts and non-wovens, which are permeable to liquids.

21. The method in accordance with claim 1, wherein components (10) which are arranged sequentially in a liquid system have separate envelopes (15) with embedded electrodes (20, 25), and one of separate sensors are assigned to the electrodes (20, 25) and the electrodes (20, 25) are connected in parallel and to a common sensor.

22. The method in accordance with claim 1, wherein the envelope (15) is of a plurality of fitted elements and shaped sections.

* * * * *